United States Patent
Cheng

[11] Patent Number: 5,592,306
[45] Date of Patent: Jan. 7, 1997

[54] SCANNING APPARATUS INCLUDING A LIGHT ADJUSTING DEVICE

[75] Inventor: Andy Cheng, Hsin-Chu, Taiwan

[73] Assignee: Must Systems Inc., Hsin-Chu, Taiwan

[21] Appl. No.: 528,790

[22] Filed: Sep. 15, 1995

[51] Int. Cl.$^6$ .................................................. H04N 1/40
[52] U.S. Cl. ........................................ 358/464; 358/475
[58] Field of Search .................................. 358/464, 471, 358/474, 475; 348/216–217; 382/274; H04N 1/40

[56] References Cited

U.S. PATENT DOCUMENTS

| | | | |
|---|---|---|---|
| 4,952,972 | 8/1990 | Someya | 358/475 |
| 5,084,772 | 1/1992 | Shimoyama | 358/475 |
| 5,119,211 | 6/1992 | Sakurai | 358/464 |
| 5,151,797 | 9/1992 | Nosaki et al. | 358/464 |
| 5,278,674 | 1/1994 | Webb et al. | 358/475 |
| 5,296,944 | 3/1994 | Suzuki et al. | 358/475 |
| 5,336,976 | 8/1994 | Webb et al. | |
| 5,414,535 | 5/1995 | Kanmoto et al. | 358/475 |

*Primary Examiner*—Kim Vu
*Attorney, Agent, or Firm*—Christie, Parker & Hale, LLP

[57] ABSTRACT

The present invention is related to a scanning apparatus which includes a scanning device emitting a light to a scanned target and receiving a reflected light from the scanned target for scanning the scanned target, and a light-adjusting device electrically connected to the scanning means and adjusting the light emitted from the light source in accordance with the reflected light. The scanning apparatus according to the present invention uses the light-adjusting device to make the scanning device capable of scanning objects having various background colors, i.e. various transmission/reflection ratios, so that a high efficiency and a high resolution image can be obtained.

13 Claims, 2 Drawing Sheets

SCANNING APPARATUS INCLUDING A LIGHT ADJUSTING DEVICE

BACKGROUND OF THE INVENTION

The present invention is related to a scanning apparatus. In spite of the rapid and almost complete developement of the scanner products and the related technology, so far, the scanned targets to be scanned by the conventional scanners are still limited to those pictures or characters with white background. For some kinds of scanned targets with one or more background colors having low reflection degree, it is difficult to obtain a high efficiency and high resolution image. Thereby, the application of the scanner will be limited.

SUMMARY OF THE INVENTION

An object of the present invention is to provide a scanning apparatus which has an adjustable light source emitting a desired intensity of light according to the detected background of a scanned target to be sacnned so that an optimal transmission/reflection ratio of the scanned target can be obtained and the scanning efficiency and resolution can thus be improved.

In accordance with the present invention, the scanning apparatus includes a scanning means emitting a light to a scanned target and receiving a reflected light from the scanned target for scanning the scanned target, and a light-adjusting means electrically connected to the scanning means and adjusting the light emitted from the light source in accordance with the reflected light.

In accordance with another aspect of the present invention, the scanning means includes a light source for emitting the light, and an image-sensing device for receiving the reflected light and generating an image signal in response to the reflected light. Preferably, the image-sensing device is a CCD.

In accordance with another aspect of the present invention, the light-adjusting means includes a background detecting circuit receiving the reflected light and generating a data signal related to the background data of the scanned target; a light-intensity detecting device installed near the light source for detecting an intensity of the light emitted by the light source and generating a light-intensity signal in accordance with the intensity of the light; a micro-processor electrically connected to the image-sensing device, the background detecting circuit and the light-intensity signal, comparing the image signal generated by the image-sensing device, the data signal generated by the light-detecting device and the light-intensity signal generated by the light-intensity detecting device, and outputting a modifying signal according to the compared result; and a light-control device electrically connected to the micro-processor and the light source, and outputting a light-control signal in response to the modifying signal to the light source for controlling an intensity of the light. The background data can be a transmission/reflection ratio of the background of the scanned target. The light-control signal can be a stepped signal or a linear signal.

In accordance with another aspect of the present invention, the light-control device further includes a signal-adjusting circuit electrically connected to the micro-processor, receiving the modifying signal and adjusting a potential level and a current level of the modifying signal, a first converting circuit electrically connected to the signal-adjusting circuit for converting the modifying signal from a first direct current state to an alternate current state, and a second converting circuit electrically connected to the first converting circuit for raising the potential level of the modifying signal and converting the resulting modifying signal from the alternate current state to a second direct current state to obtain the light-control signal.

In accordance with another aspect of the present invention, the light-control device preferably further includes a feedback current detecting and controlling circuit electrically connected to the second convening circuit and the light source for converting a signal having the second direct current state into the light-control signal and outputting the light-control signal to enable the light source to emit the light having a certain intensity, and a feedback enabling and adjusting circuit electrically connected to the signal-adjusting circuit, the first converting circuit and the feedback current detecting and controlling circuit for providing feedback and enabling functions of the signal-adjusting circuit, the first converting circuit and the feedback current detecting and controlling circuit. Preferably, the light-adjusting means further includes a data-control interface electrically connected between the image-sensing device and the micro-processor for passing therethrough the image signal.

In accordance with another aspect of the present invention, the micro-processor can be a central processing unit (CPU), and the CPU can be a single chip or a central processing unit of a computer.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
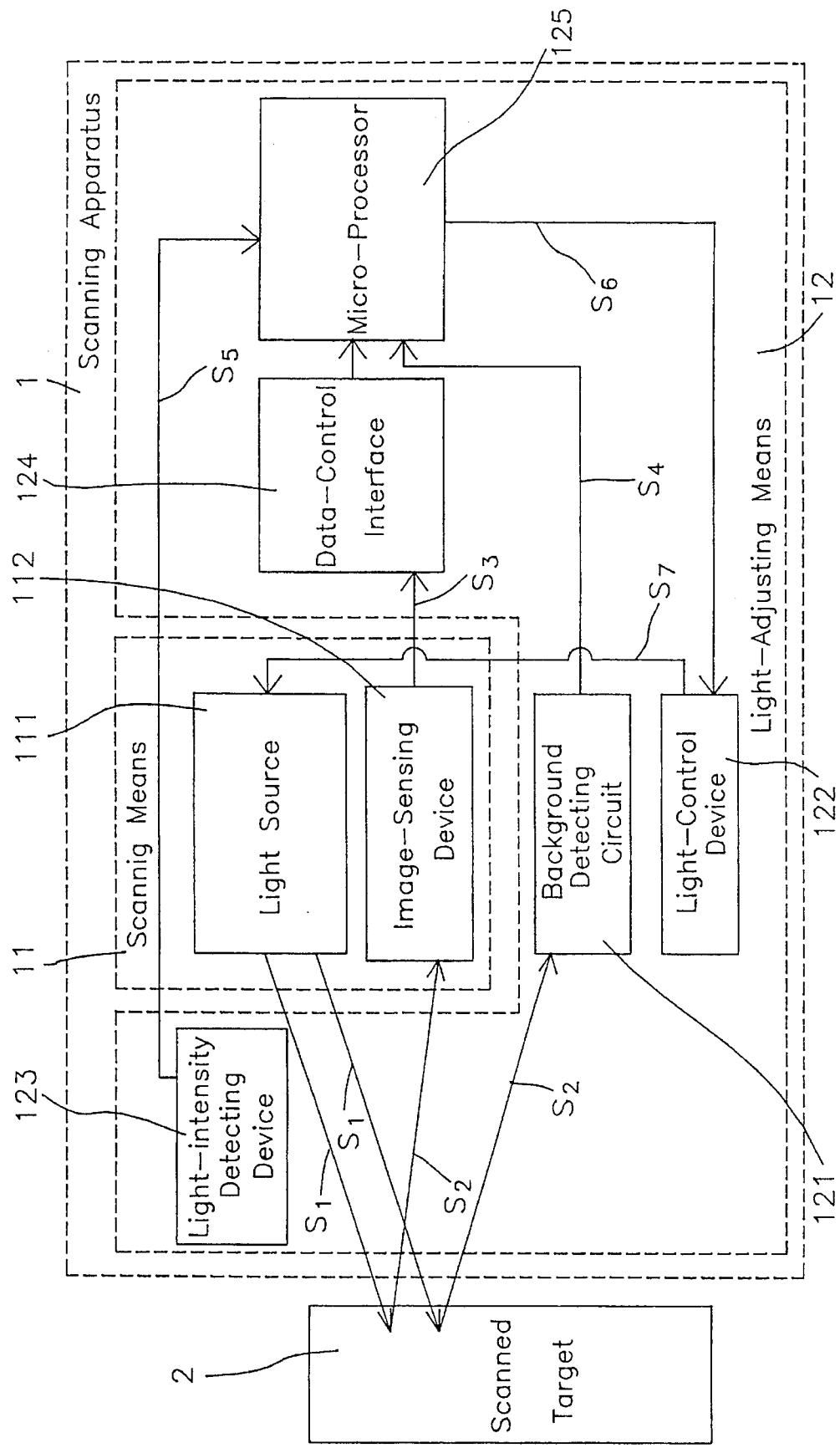
FIG. 1 is a schematic block diagram showing a preferred embodiment of a scanning apparatus according to the present invention.

Please refer to FIG. 1 which is a schematic block diagram showing a preferred embodiment of a scanning apparatus according to the present invention. The scanning apparatus 1 shown in FIG. 1 includes a scanning means 11 and a light-adjusting means 12. The scanning means 11 includes a light source 111 and a image-sensing device (herein, a CCD) 112; and the light-adjusting means 12 includes a background detecting circuit 121, a light-control device 122, a light-intensity detecting device 123, a data-control interface 124 and a micro-processor 125. The working principle of the elements shown in FIG. 1 will be described as follows.

The light source 111 emits light S1 to a scanned target 2 first and the light S2 reflected by the scanned target 2 is received by the CCD 112 and the background detecting circuit 121 simultaneously. After the CCD 112 senses the light S2, an image signal S3 is generated by the CCD 112 and transmitted to the micro-processor 125 through the data-control interface 124. Meanwhile, after the background detecting circuit 121 detects the light S2, a data signal S4 related to the background data, i.e., the transmission/reflection ratio of the background of the scanned target, is generated by the background detecting circuit 121 and also transmitted to the micro-processor 125. In addition, the light-intensity detecting device 123 mounted near the output of the light source 111 also outputs a light-intensity signal S5 to the micro-processor 125 in accordance with the intensity of the light emitted by the light source 111. The micro-processor 125 receives and compares the image signal S3, the data signal S4 and the light-intensity signal S5, and outputs a modifying signal S6 to the light-control device 122 according to the comparing result so that an optimal light intensity can be provided for better scanning results. The light-control device 122 generates a light-control signal S7 in response to the modifying signal S6 and outputs the light-control signal S7 to the light source 111 for adjusting the intensity of the light emitted from the light source 111. The above working cycle is repeated so that the light can be mobilely adjusted to comply with the requirement for different transmission/reflection ratios of the background of the scanned target. Furthermore, the light S1 can be instantaneously stablized to rapidly achieve the intensity suitable for the scanned target because of to the feedback compensation of the light-intensity detecting device 123.

Figure 2:
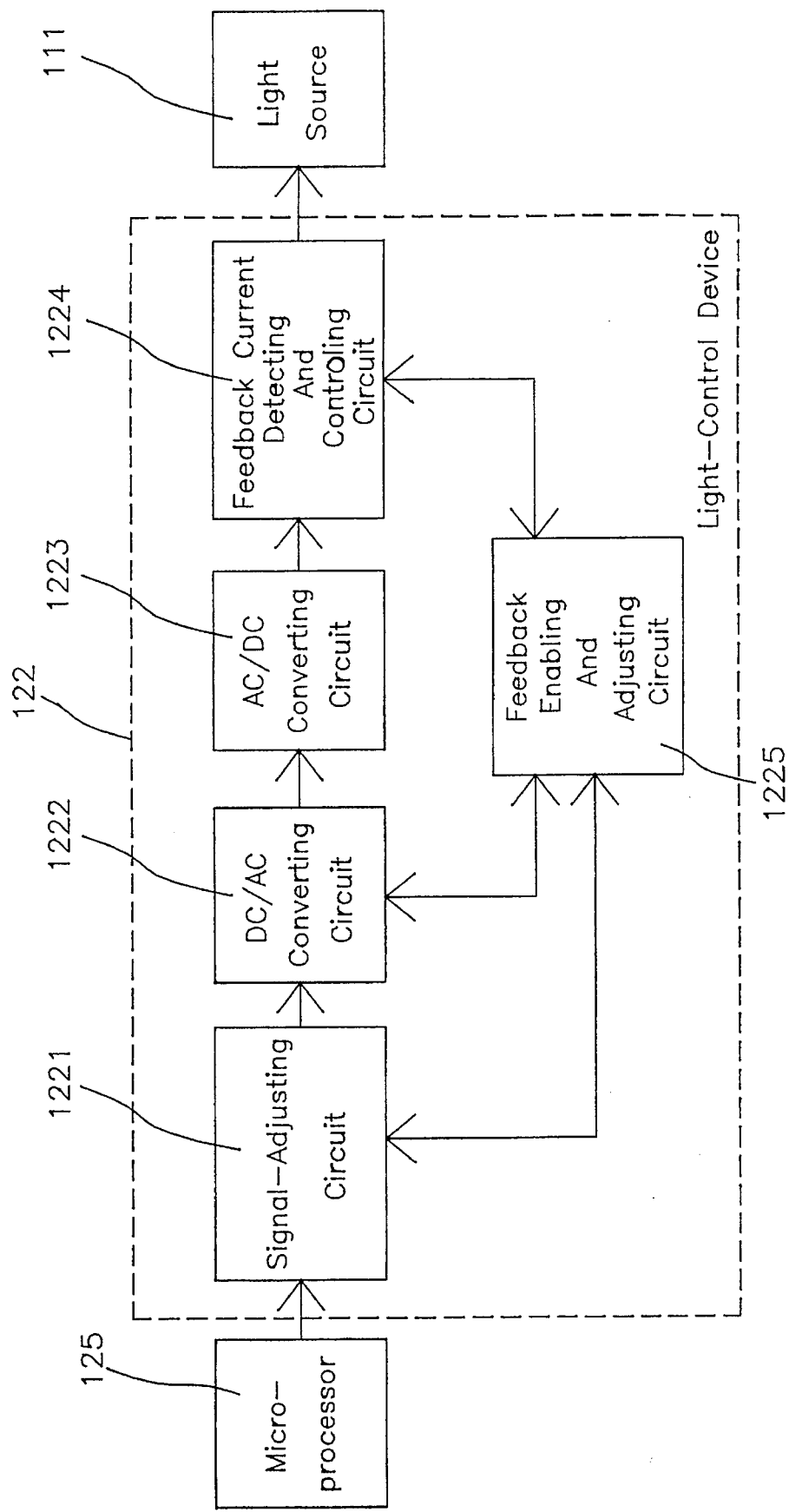
FIG. 2 is a schematic block diagram showing a preferred embodiment of a light-control device according to the present invention.

Refer now to FIG. 2, which is a schematic block diagram showing a preferred embodiment of a light-control device according to the present invention. The light-control device shown in FIG. 2 includes a a signal-adjusting circuit 1221 receiving the modifying signal S7 and adjusting the potential level and the current level of the modifying signal S6, a first converting circuit 1222 convening the modifying signal S6 from a direct current state to an alternate current state, a second converting circuit 1223 raising the potential level of the modifying signal S6 and converting the resulting modifying signal from an alternate current state to a direct current state, a feedback current detecting and controlling circuit 1224 convening the direct current signal S6' into the light-control signal S7 and outputting the light-control signal S7 to enable the light source to emit the light having an appropriate intensity, and a feedback enabling and adjusting circuit 1225 providing feedback and enabling functions for the signal-adjusting circuit 1221, the first converting circuit 1222 and the feedback current detecting and controlling circuit 1224.

The scanning apparatus according to the present invention has the following advantages:

1. The light source can be easily controlled to adjustably emit a light having an intensity suitable for the background of the scanned target to achieve the purpose of improving scanning efficiency and resolution;
2. The light-adjusting means is adapted to be used with various kinds of scanners so that the application of the present invention is thus wide.

In summary, the present invention uses a low-cost adjusting means to make the scanning means capable of scanning objects having various background colors, i.e., various transmission/reflection ratios, so that a high efficiency and a high resolution image can be obtained.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning apparatus, comprising:

scanning means for emitting a light to a scanned target and receiving a reflected light from said scanned target for scanning said scanned target; and light-adjusting means electrically connected to said scanning means for adjusting said emitted light in accordance with said reflected light, said light adjusting means comprising a background detecting circuit for receiving said reflected light and generating a data signal related to background data of said scanned target, and a light-intensity detecting device installed near the emitted light for detecting an intensity of the emitted light and generating a light-intensity signal in accordance with said intensity of the emitted light.

2. A scanning apparatus according to claim 1 wherein said scanning means includes:

a light source for emitting said light; and an image-sensing device for receiving said reflected light and generating an image signal in response to said reflected light.

3. A scanning apparatus according to claim 2 wherein said image-sensing device is a CCD.

4. A scanning apparatus according to claim 2 wherein said light-adjusting means further includes:

a micro-processor electrically connected to said image-sensing device, said background detecting circuit and said light-intensity signal for comparing said image signal generated by said image-sensing device, said data signal generated by said light-detecting device and said light-intensity signal generated by said light-intensity detecting device, and outputting a modifying signal according to the compared result; and a light-control device electrically connected to said micro-processor and said light source, and outputting a light-control signal in response to said modifying signal to said light source for controlling an intensity of said light.

5. A scanning apparatus according to claim 1 wherein said background data is a transmission/reflection ratio of the background of said scanned target.

6. A scanning apparatus according to claim 4 wherein said light-control signal is a stepped signal.

7. A scanning apparatus according to claim 4 wherein said light-control signal is a linear signal.

8. A scanning apparatus according to claim 4 wherein said light-control device further includes:

a signal-adjusting circuit electrically connected to said micro-processor for receiving said modifying signal and adjusting a potential level and a current level of said modifying signal;

a first converting circuit electrically connected to said signal-adjusting circuit for converting said modifying signal from a first direct current state to an alternate current state; and a second converting circuit electrically connected to said first converting circuit for raising said potential level of said modifying signal and converting the resulting modifying signal from said alternate current state to a second direct current state.

9. A scanning apparatus according to claim 8 wherein said light-control device further includes:

a feedback current detecting and controlling circuit electrically connected to said second converting circuit and said light source for converting a signal having said second direct current state into said light-control signal and outputting said light-control signal to enable said light source to emit said light having a certain intensity; and a feedback enabling and adjusting circuit electrically connected to said signal-adjusting circuit, said first converting circuit and said feedback current detecting and controlling circuit for providing feedback and enabling functions for said signal-adjusting circuit, said first converting circuit and said feedback current detecting and controlling circuit.

10. A scanning apparatus according to claim 4 wherein said light-adjusting means further includes a data-control interface electrically connected between said image-sensing device and said micro-processor for passing therethrough said image signal.

11. A scanning apparatus according to claim 4 wherein said microprocessor is a central processing unit (CPU).

12. A scanning apparatus according to claim 11 wherein said CPU is a single chip.

13. A scanning apparatus according to claim 11 wherein said CPU is a central processing unit of a computer.

\* \* \* \* \*

UNITED STATES PATENT AND TRADEMARK OFFICE
CERTIFICATE OF CORRECTION

PATENT NO. : 5,592,306
DATED : January 7, 1997
INVENTOR(S) : Andy Cheng

It is certified that error appears in the above-indentified patent and that said Letters Patent is hereby corrected as shown below:

Column 1, line 8, change "developement" to -- development --.
Column 2, line 11, change "convening" to -- converting --.
Column 2, line 58, before "image-sensing" change "a" to -- an --.
Column 3, line 26, delete "to".
Column 3, line 32, delete "a" (second occurrence).
Column 3, line 35, change "convening" to -- converting --.
Column 3, line 41, change "convening" to -- converting --.

Signed and Sealed this

Twenty-sixth Day of May, 1998

Attest:

BRUCE LEHMAN

Attesting Officer

Commissioner of Patents and Trademarks